UNITED STATES PATENT OFFICE.

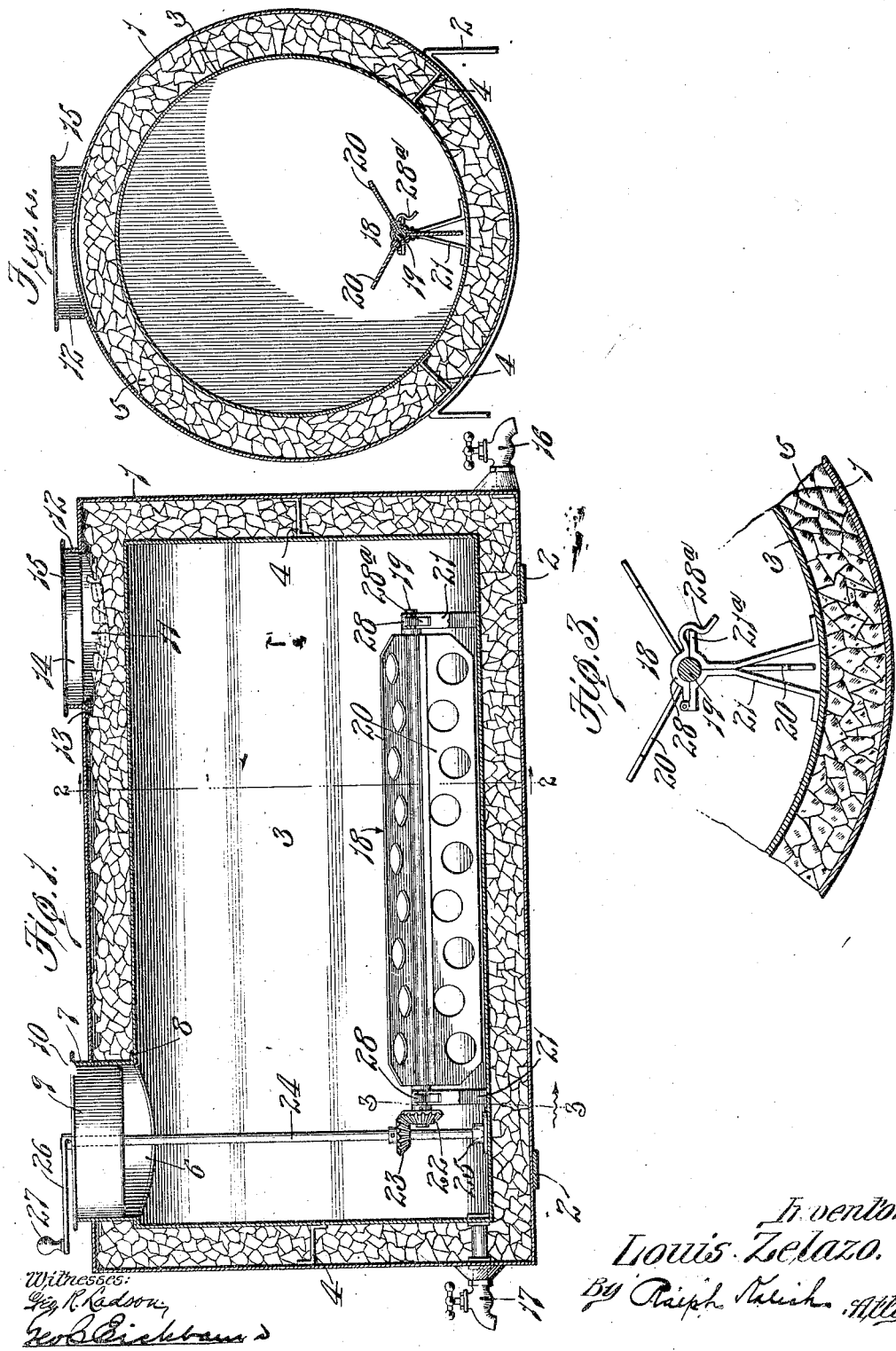

LOUIS ZELAZO, OF ST. LOUIS, MISSOURI.

LIQUID COOLER OR RECEPTACLE.

987,031.

Specification of Letters Patent. Patented Mar. 14, 1911.

Application filed April 11, 1910. Serial No. 554,615.

*To all whom it may concern:*

Be it known that I, LOUIS ZELAZO, a citizen of the United States, residing at the city of St. Louis, State of Missouri, have invented a certain new and useful Improvement in Liquid Coolers or Receptacles, of which the following is a specification, reference being had to the accompanying drawings, forming a part hereof, in which—

Figure 1 is a longitudinal sectional view through my new liquid cooler or receptacle; Fig. 2 is a vertical sectional view on the line 2—2, Fig. 1; and Fig. 3 is a detail sectional view on the line 3—3, Fig. 1.

This invention relates to a new and useful improvement in liquid-coolers or receptacles, the objects of my invention being to provide a receptacle adapted particularly for containing or holding sweet-milk, butter-milk, cream, and the like, in which the milk or cream may be cooled and the temperature thereof maintained at a proper degree, the milk or cream being thereby protected from changes in the surrounding atmosphere and thus preserved, and from which the milk or cream may be served or supplied direct to the consumer with their several constituents or ingredients thoroughly mixed or intermingled, and to improve generally upon receptacles of the kind stated.

With this object in view, my invention consists in the novel construction of the several parts of my cooler or receptacle and in the novel arrangement and combination of the same, all as will hereinafter be described and afterward pointed out in the claims.

While my cooler or receptacle is particularly adapted, as stated, for containing and cooling milk and cream, and has been heretofore used, and will be herein described, in that connection, yet it is to be understood that my cooler or receptacle might equally well be used for containing and cooling other liquids or fluids.

In the drawings, wherein like reference characters refer to like parts throughout the several views, 1 indicates an outer casing, which is preferably cylindrical and which may be of sheet metal or any other suitable material, casing 1 being preferably supported upon a floor or other suitable place by means of suitable standards 2 (partly shown).

Suitably arranged within, and spaced away from, said outer casing 1 is an inner casing 3, which inner casing 3 is also preferably cylindrical and which may also be of sheet metal or any other suitable material, suitable flanged connecting-pieces or Z-bars 4 being preferably arranged between and connected to said casings 1 and 3 for obvious purposes. The said inner casing 3 is preferably separated on all sides from said outer casing 1, thereby providing a space, as at 5, extending completely therearound, in which space is adapted to be received and hold broken ice, as shown.

Preferably at or near its forward end, casing 3 is provided with an inlet-opening, as at 6, and supported upon casing 3 and surrounding said opening 6 is a small section of tubing or neck portion 7 having its lower edge preferably flanged outwardly, as at 8, and soldered or otherwise suitably secured to said casing. This neck portion 7, as shown in Fig. 1, fits through an alining opening in, and extends slightly above, casing 1, inlet-opening 6 being adapted to be closed by a suitable cover 9 removably fitting in said neck-portion 7 and having preferably an over-hanging portion or flange 10.

Preferably at or near its rear end, casing 1 is also provided with an inlet-opening, as at 11, and supported upon casing 1 and surrounding said opening 11 is a small neck-portion 12 having its lower edge preferably flanged outwardly, as at 13, and soldered or otherwise suitably secured to said casing. The top of neck-portion 12 is preferably on a level with the top of neck-portion 7, and inlet-opening 11 is likewise adapted to be closed by a suitable cover 14 removably fitting in said neck-portion 12 and having preferably an over-hanging portion or flange 15.

The broken or chipped ice is delivered into said space 5 between casings 1 and 3 through said inlet-opening 11, the ice being delivered and spread until said space is preferably completely filled and said inner casing 3 covered on all sides thereby, the water from such ice being drawn off from said space whenever necessary or desired through a suitable faucet 16 mounted on casing 1 and communicating with said space.

The casing 3 is adapted to hold or contain the milk or cream, the same being delivered thereinto through inlet-opening 6 and to be drawn or taken therefrom whenever desired through a suitable faucet 17 arranged on casing 1 and communicating with the interior of casing 3. The milk or cream in casing 3 being surrounded by said ice, will be cooled and protected from changes in the surrounding atmosphere, the temperature of the milk or cream being maintained at a proper degree and the milk or cream thus preserved. As is well known, however, milk, and particularly butter-milk, or cream, when allowed to stand, will settle, that is, the heavier constituents or ingredients of the milk or cream will fall to the bottom and the lighter constituents or ingredients go to the top, and that the milk or cream, when so served or furnished to the consumer, will vary in quality. In order, therefore, that the milk or cream may be agitated and the several constituents or ingredients thoroughly mixed or intermingled before the milk or cream is served, I have provided in casing 3 the agitator or stirrer 18. This stirrer 18 comprises a shaft 19 and a plurality of preferably perforated blades 20 fixedly secured or arranged in any suitable manner on said shaft 19. Stirrer 18 is preferably horizontally disposed in casing 3, shaft 19 being rotatably and preferably loosely mounted on suitable standards 21 resting upon and secured to said casing 3. Shaft 19 at preferably its forward end is provided with a beveled gear 22 adapted to mesh with a beveled pinion 23 fixedly arranged on a shaft 24. Shaft 24, at its lower end, is supported in a step-bearing 25 fixed to the casing 3, and at its upper end has a bearing in cover 9 and is provided with a suitable crank 26 having an operating handle or knob 27.

Preferably the standards 21 are of such a height and the blades 20 of stirrer 18 are of such a width that said blades, on the rotation of shaft 19, just clear the lower inner surface of casing 3. It will thus be seen that, when the crank 26 is operated, said stirrer 18 will, through the means stated, be rotated, and the constituents or ingredients of the milk or cream in casing 3 be thereby thoroughly mixed or intermingled, the milk or cream served or furnished from my cooler or receptacle being fresh, cool, and of uniform quality or thickness. Through the agitation of the milk or cream in casing 3 by stirrer 18, as will be clear, new portions of the milk or cream will be presented to the cooling action of the ice in space 5, whereby the milk or cream in casing 3 will be rapidly cooled and the temperature thereof maintained practically uniform throughout. I have heretofore employed my new cooler or receptacle principally in connection with the sale of butter-milk, and from experience I can state it as a fact that by and through the employment of my cooler or receptacle as described, the amount or number of gallons of butter-milk sold has increased more than thirty-fold.

The stirrer 18 is preferably held in position on said standards 21 by means of arms or clips 28, as shown particularly in Fig. 3. These arms or clips 28 are preferably hinged at one end to said standards 21, recessed in their middle to fit shaft 19, and at their other end are provided with spring portions 28ᵃ adapted to snap over and releasably engage with portions 21ᵃ of standards 21. It will be observed that the diameter of inlet-opening 6 is sufficient to permit the passage therethrough of stirrer 18. Whenever, therefore, it is desired to clean said stirrer and associate parts, cap 9 and shaft 24 are removed from position, gear-wheels 22 and 23 being thereby disengaged, spring-portions 28ᵃ released from engagement with portions 21ᵃ of standards 21, and the stirrer 18 then readily taken from its bearings and removed from the casing through said opening 6.

I am aware that minor changes in the arrangement, construction, and combination of the several parts of my cooler or receptacle may be made and substituted for those herein shown and described without departing from the nature and principle of my invention.

Having thus described my invention, what I claim and desire to secure by Letters Patent is:

1. The combination with a liquid cooler comprising an outer casing and an inner casing arranged within and spaced from said outer casing, a space being thereby provided between said casings for ice to cool the liquid contained in said inner casing, of a stirrer adapted to agitate said liquid and thereby present all portions thereof to the cooling action of said ice, said stirrer being horizontally arranged within said inner casing below the horizontal center, and bodily rotatable in the lower half thereof, and a vertically-disposed shaft engaging with said stirrer and adapted to rotate the same, said shaft being mounted at one end in said inner casing and extending to the exterior at its other end through said inner and outer casings; substantially as described.

2. The combination with a liquid-cooler comprising an outer casing and an inner casing provided with an inlet-opening and arranged within and spaced from said outer casing, a space being thereby provided between said casings for ice to cool the liquid contained in said inner casing, of a stirrer adapted to agitate said liquid and thereby present all portions thereof to the cooling action of said ice, said stirrer being horizontally arranged within said inner casing below the horizontal center, and bodily rotatable in the lower half thereof, a cover for said inner-casing-inlet-opening, and a vertically-disposed shaft engaging with said stirrer and adapted to rotate the same, said shaft being supported at one end on said inner casing and at its other end in said cover; substantially as described.

3. The combination with a liquid-cooler comprising an outer casing and an inner casing provided with an inlet-opening and arranged within and spaced from said outer casing, a space being thereby provided between said casings for ice to cool the liquid contained in said inner casing, of a stirrer adapted to agitate said liquid and thereby present all portions thereof to the cooling action of said ice and removably arranged within said inner casing below the horizontal center, and bodily rotatable in the lower half, thereof, said inner-casing-inlet-opening being of a diameter sufficient to permit the passage therethrough of said stirrer, a removable cover for said inner-casing-inlet-opening, and a vertically-disposed shaft engaging with said stirrer and adapted to rotate the same, said shaft being removably mounted at one end on said inner casing and at its other end in said cover; substantially as described.

In testimony whereof, I have signed my name to this specification in the presence of two subscribing witnesses.

LOUIS ZELAZO.

Witnesses:
GEORGE C. EICHBAUM,
CAROLINE L. WEBER.